US007487380B2

(12) United States Patent
Brumme et al.

(10) Patent No.: US 7,487,380 B2
(45) Date of Patent: Feb. 3, 2009

(54) EXECUTION RECOVERY ESCALATION POLICY

(75) Inventors: Christopher W Brumme, Mercer Island, WA (US); WeiWen Liu, Redmond, WA (US); Mahesh Prakriya, Redmond, WA (US); Sean E Trowbridge, Sammamish, WA (US); Ian H Carmichael, Sammamish, WA (US); Patrick H Dussud, Bellevue, WA (US); Brian M Grunkemeyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 10/966,333

(22) Filed: Oct. 14, 2004

(65) Prior Publication Data

US 2006/0101401 A1     May 11, 2006

(51) Int. Cl.
*G06F 11/00* (2006.01)

(52) U.S. Cl. ............... 714/3; 714/11; 714/37; 714/38; 714/55; 712/216; 717/124; 717/126; 717/127

(58) Field of Classification Search ............... 714/11, 714/37, 38, 55, 3; 712/216; 717/124, 126, 717/127
See application file for complete search history.

(56) References Cited

U.S. PATENT DOCUMENTS 6,418,542 B1 *   7/2002   Yeager ................. 714/38
2005/0015672 A1 * 1/2005   Yamada ................ 714/38

FOREIGN PATENT DOCUMENTS

EP      1083484 A2 *   3/2001
EP      1087295 A2 *   3/2001

* cited by examiner

*Primary Examiner*—Robert Beausoliel
*Assistant Examiner*—Charles Ehne (57) ABSTRACT

Deterministic code execution may be recovered for programs or portions thereof by implementing a programmable policy on a system host to escalate the scope of a code discard based on various parameters.

25 Claims, 4 Drawing Sheets

EXECUTION RECOVERY ESCALATION POLICY

FIELD

The description that follows relates to deterministic processing. More particularly, the description relates to providing deterministic processing upon occurrence of, at least, a resource failure.

BACKGROUND

Code developers are charged with a daunting task of authoring code that is state-consistent in the face of unanticipated or unexpected conditions. State-consistent code refers to code that is deterministic, i.e., keeps track of an executed process. Unanticipated or unexpected conditions refer to asynchronous executions such as thread abort conditions, out-of-memory conditions, and stack overflow conditions. These conditions are asynchronous in the sense that they are not typically expected in the normal execution of the authored code. Although such conditions may occur in most application programming interface environments, typically these conditions are injected by the runtime environment in which the code is executed.

More particularly, the runtime environment provides routines for application programs to perform properly in an operating system because application programs require another software system in order to execute. Thus, an application program calls one or more of the runtime environment routines, which reside between the application program and the operating system, and the runtime environment routines call the appropriate operating system routines.

Examples of runtime environments include: Visual Basic runtime environment; Win32; Java® Virtual Machine runtime environment that is used to run, e.g., Java® routines; or Common Language Runtime (CLR) to compile, e.g., Microsoft.NET™ applications into machine language before executing a calling routine. Deterministic execution of executable code is jeopardized by, among other factors, a runtime environment induced resource failure (e.g., thread abort, out-of-memory, or stack overflow).

SUMMARY

The paragraph that follows represents a summary to provide a basic understanding to the reader. The summary is not an exhaustive or limiting overview of the disclosure. Further, the summary is not provided to identify key and/or critical elements of the invention, delineate the scope of the invention, or limit the scope of the invention in any way. The purpose of the summary is to introduce one or more of the concepts described below in a simplified form.

More particularly, upon detection of a processing exception, deterministic code execution may be recovered for programs or portions thereof by implementing a programmable policy on a system host to escalate the scope of a code discard based on various parameters.

BRIEF DESCRIPTION OF THE DRAWINGS

The detailed description refers to the following drawings.

DETAILED DESCRIPTION

The following description is directed to techniques for providing deterministic code execution in the face of, e.g., resource failures or exceptional conditions.

Figure 1:
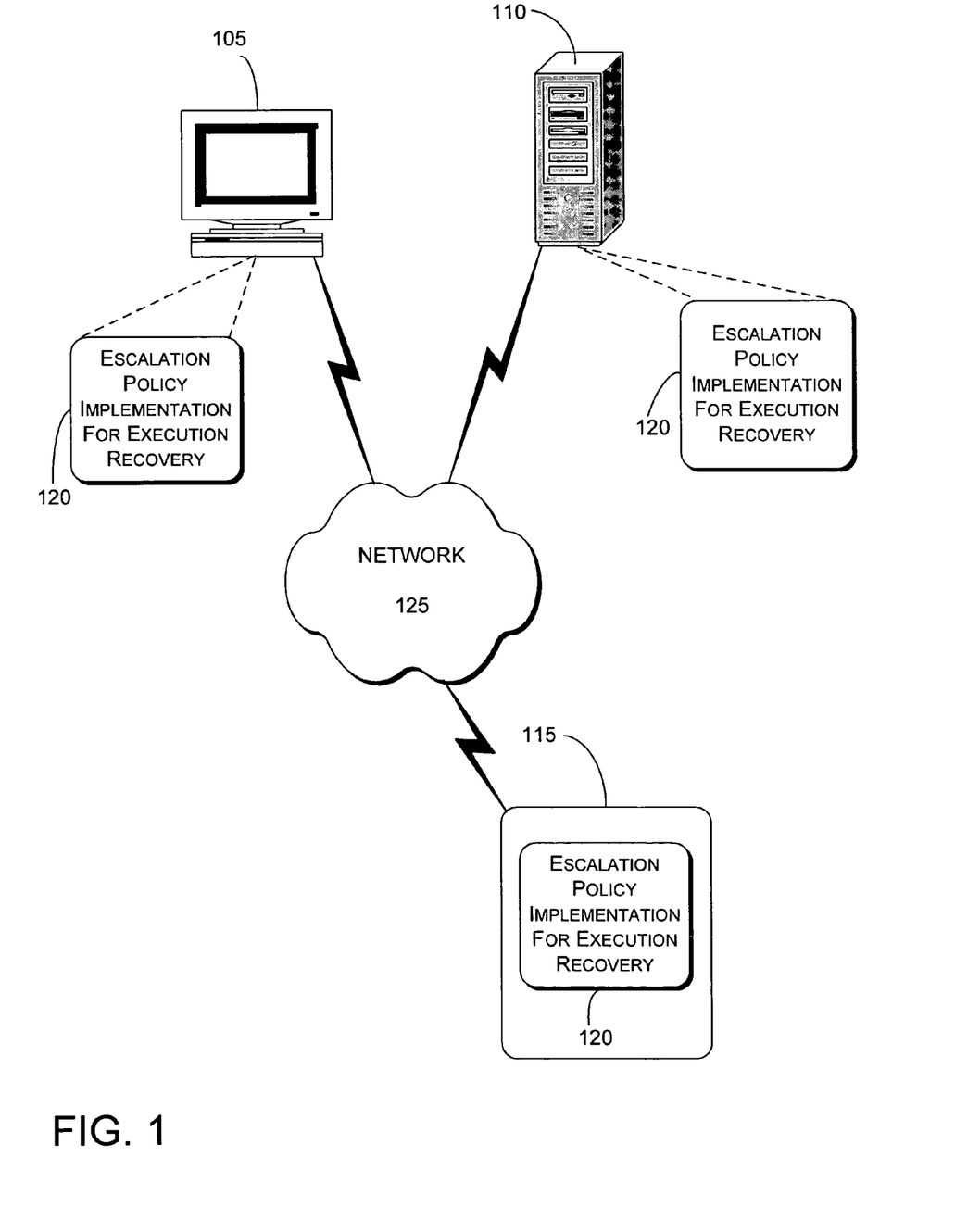
FIG. 1 shows a network environment for implementing examples of execution recovery based on an escalation policy.

FIG. 1 shows an example of a network environment in which one or more processing devices implement execution recovery based on an escalation policy. Client device 105, server device 110, and "other" device 115 may be communicatively coupled to one another through network 125. Further, client device 105, server device 110, and "other" device 115 may be capable of hosting executable processes, programs, or portions thereof in, for example, a runtime environment. That is, client device 105, server device 110, and "other" device 115 are capable of implementing an escalation policy 120 to provide deterministic execution of code, in accordance with at least the examples described herein.

Client device 105 may be one of a variety of conventional computing devices, including a desktop personal computer (PC), workstation, mainframe computer, Internet appliance, set-top box, and gaming console. Further, client device 105 may be any device capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105. An example of client device 105 is described in more detail below with reference to FIG. 4.

Server device 110 may provide any of a variety of data and/or functionality to client device 105 or "other" device 115. The data may be publicly available or alternatively restricted, e.g., available if an appropriate subscription or licensing fee is paid or restricted to certain users. Server device 110 may be at least one of a network server, an application server, a web blade server, or any combination thereof. Typically, server device 110 is any device that is a source of content, and client device 105 is any device that receives such content from server device 110 either via network 125 or via an off-line medium. However, according to the examples described herein, server device 105 and client device 110 may interchangeably be a sending host or a receiving host. "Other" device 115 may also be embodied by any of the above examples of server device 110. An example of server device 110 is described in more detail with reference to FIG. 4.

"Other" device 115 may further be any device capable of implementing an escalation policy 120 in accordance with any of the examples described herein. That is, "other" device 115 may be any software-enabled computing or processing device capable of providing deterministic code execution in the face of, e.g., a runtime environment-induced failure for at least a portion of an executable program, application, function, or other assemblage of programmable and executable code. Thus, "other" device 115 may be a computing or processing device having an interpreter, converter, compiler, operating system, Java® Virtual Machine, or Common Language Runtime (CLR) implemented thereon.

Network 125 may represent any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Figure 2:
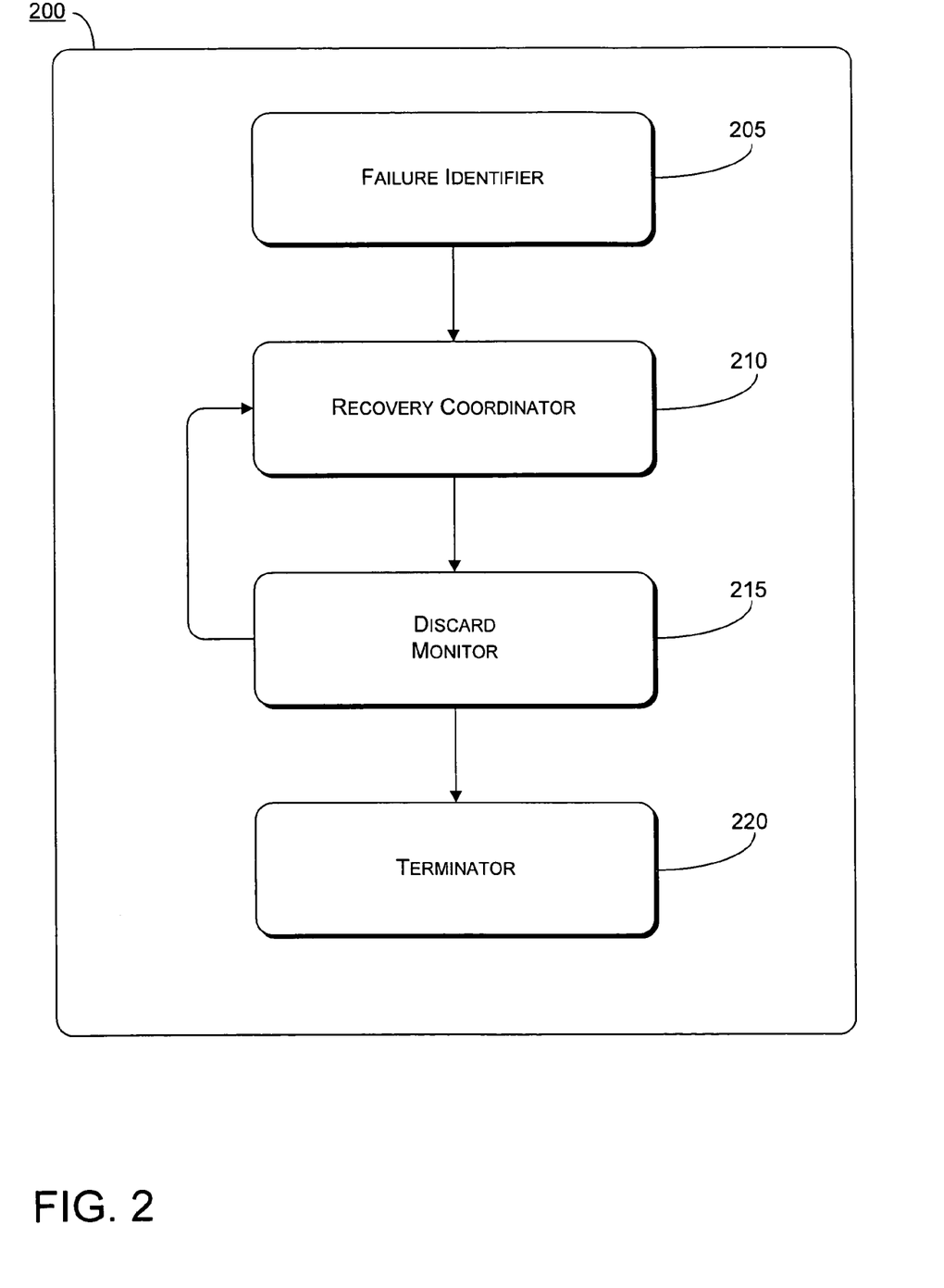
FIG. 2 shows an example of a system for implementing at least one example of execution recovery based on an escalation policy.

FIG. 2 shows an example of a system 200, which may be a platform for execution recovery based on an escalation policy, thus providing deterministic code execution for programs or portions thereof in a programming interface environment, e.g., a runtime environment. Such deterministic code execution recovery may result from a programmable policy, implemented on the host of system 200, that escalates the scope of a code discard based on discard conditions corresponding to an identification or categorization of a runtime environment induced resource failure. It is understood that a "code discard" as described herein may include the discard of code, state, or any combination thereof.

System 200 may include the following modules, either singularly or in various combinations thereof: module 205 representing a failure identifier, module 210 representing a code discarder, module 215 representing a discard monitor, and module 220 representing a terminator. In system 200 as well as alternate examples thereof, one or more of modules 205, 210, 215, and 220 may be implemented as processor-executable instructions that are embodied in at least one form of computer-readable media. Further, one or more of modules 205, 210, 215, and 220 may be implemented as hardware, firmware, software, or any combination thereof. Further still, the capabilities described in correspondence with the respective modules 205, 210, 215, and 220 may be divided or combined in one or more of the modules, in accordance with alternative implementations.

Failure identifier 205 may identify and categorize a runtime environment induced resource failure occurring in a hosted process, program, or portion thereof. The description of such runtime environment induced resource failures refer to resource failures induced by an exceptional condition in a runtime environment. Examples of such exceptional conditions in runtime environment include, but are not limited to, a thread abort condition, an out-of-memory condition, and a stack overflow condition.

A thread abort condition is a call to abort a thread in which code or a portion thereof is being executed. The motivations for a thread abort condition are numerous, and do not need to be articulated for understanding of the example embodiments described herein. Suffice to say that the injection of a runtime environment routine or subroutine into the program or portion thereof is just one factor that may produce a thread abort condition.

An out-of-memory condition may result if the execution of the program or portion thereof requires amounts of hardware memory or virtual memory that are not compatible with other processes, and therefore such memory allocations may not be accommodated.

A stack overflow condition may result if the execution of the program or portion of the program seeks to utilize more hardware memory or virtual memory than is available on a stack. Alternatively, a stack overflow condition may occur as a result of an infinite recursion or a level of method calls that extends beyond a predetermined threshold level.

Recovery coordinator 210 may be instructed or otherwise prompted by an output from failure identifier 205 to initiate a discard of at least a portion of a hosted process or program that is affected by the runtime environment induced resource failure. Although the amount or collective units of code subject to recovery coordinator 210 may vary in accordance with alternate examples, the present example is described primarily within the context of recovery coordinator 210 initiating a thread abort. Such a thread abort would pertain, at least initially, to the thread affected by the runtime environment induced resource failure. Accordingly, the present example provides a basis for understanding and practicing the aforementioned alternate examples whereby recovery coordinator 210 initiates a code discard by discarding various unit increments of related code from the process or program.

Discard monitor 215 may monitor and evaluate the progress and scope of a discard executed by recovery coordinator 210 based on predetermined discard parameters. An example of monitoring the scope of the discard may include monitoring an amount of code affected by a runtime environment induced resource failure, as well as evaluating whether the discard is being performed cleanly (i.e., there are no exceptional conditions when executing associated clean-up code or recovery code). An example of monitoring the progress of the discard may include monitoring an amount of time elapsed since commencement of the discard. An output by discard monitor 215 may determine at least one of whether recovery coordinator 210 may increase the amount of code affected by the discard (i.e., escalate the scope of the discard) and whether terminator 220 may terminate the discard of at least a portion of a process or program "rudely" or "politely."

Terminator 220 may "rudely" terminate a discard, as instructed or otherwise prompted by discard monitor 215, by prohibiting execution of clean-up code or recovery code associated with any portion of the process or program being discarded by recovery coordinator 210. The seriousness of a "rude" discard may be gleaned from the fact that, by prohibiting execution of clean-up code or recovery code, state for at least the program is not likely to be preserved and operating system resources such as memory and file handles may be leaked. Conversely, terminator 220 may "politely" terminate a discard, as instructed or otherwise prompted by discard monitor 215, by permitting execution of such clean-up code or recovery code. Terminator 220 may then execute or enable execution of portions of the process or program that are not discarded by discarder 210 (i.e., code that is beyond the scope of the discard).

Figure 3:
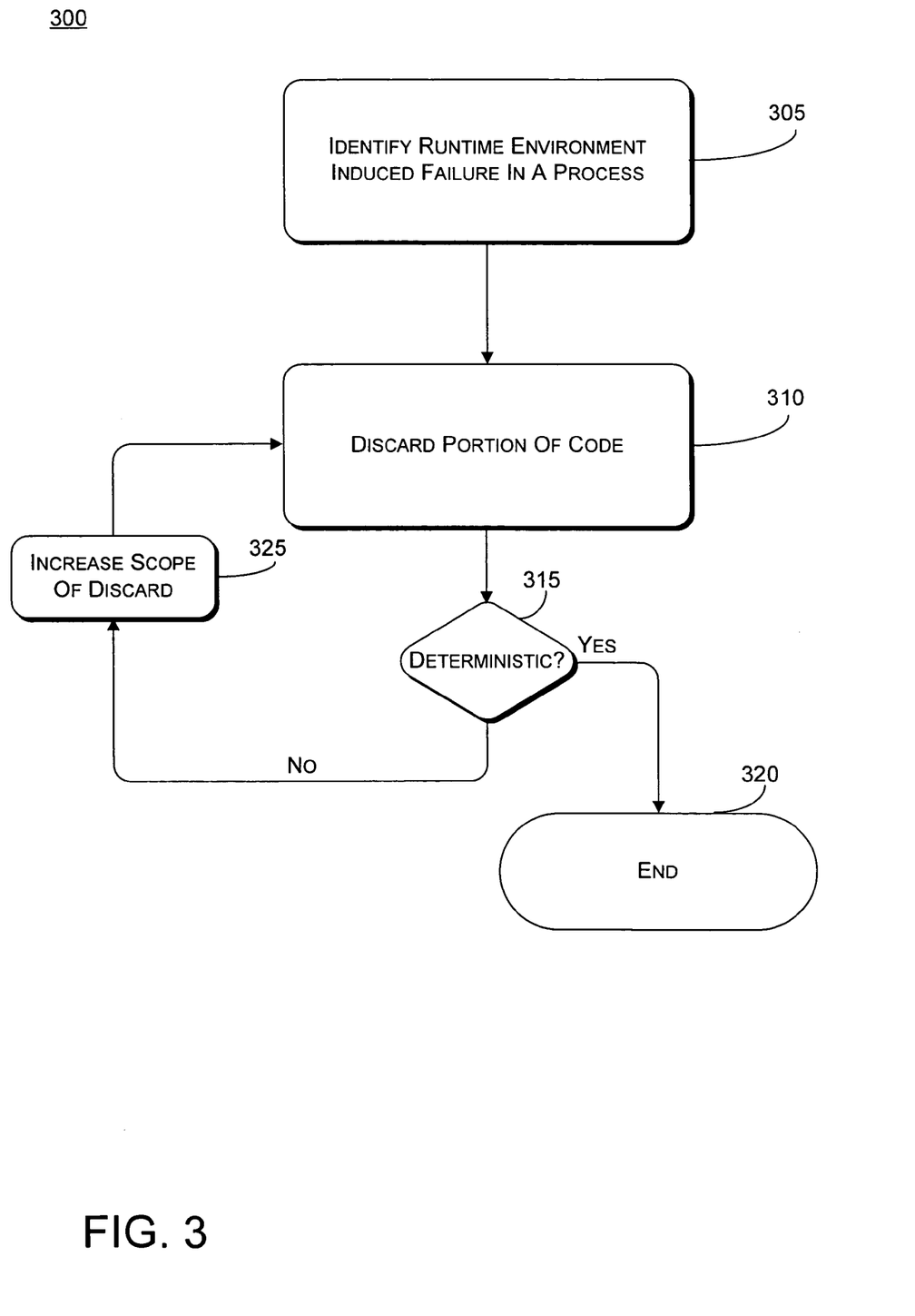
FIG. 3 shows an example of a processing flow for implementing an execution recovery based on an escalation policy.

FIG. 3 shows example processing flow 300 for implementing an execution recovery escalation policy in, e.g., a programming interface environment. Processing flow 300 may be executed by system 200, and therefore the description of FIG. 3 may refer to at least one of the system modules of FIG. 2. However, any such reference to a system module of FIG. 2 is for descriptive purposes only, and it is to be understood that system 200 of FIG. 2 is a non-limiting processing environment for processing flow 300. Further, processing flow 300 is provided as an example, and therefore is not intended to be limiting in terms of the order, sequence, and combinations of the processing blocks described below. That is, alternative examples of processing flow 300 may include the blocks described below in different orders, sequences, or even combinations.

Block 305 refers to identifying a failure in a process or program in a programming interface environment, with an example of such a failure being a runtime environment induced resource failure. According to a current example, the identification occurring at block 305 may be undertaken by failure identifier 205. That is, the identification may result from an occurrence of an associated failure mechanism, whereby an out-of-memory condition may be detected by an error code from an allocation routine, and a stack overflow condition may be detected by a stack overflow exception. Regardless of how the identification is implemented, the identification occurring at block 305 may further include categorizing a resource failure occurring as a result of, e.g., a runtime environment routine or sub-routine injected into at least a portion of the process or program. In particular, the resource failure may be categorized as being recognized, and therefore capable of being addressed, by the runtime environment hosting the process or program. Non-exclusive examples of such resource failures capable of being addressed by a runtime environment include, but are not limited to, a thread abort condition, an out-of-memory condition, and a stack overflow condition.

Block 310 refers to a discard of a portion of the process or program affected by the runtime environment induced resource failure. Neglecting to remove such portions of code may jeopardize deterministic execution of the process or program. The discard occurring at block 310 may be undertaken by recovery coordinator 210. In particular, upon being notified or otherwise prompted of a runtime environment induced resource failure, a recovery of deterministic code execution for the process or program includes initiating a discard of a portion of the process or program. An example of the discard occurring at block 310 includes an abort of a thread that executes code affected by the runtime environment induced resource error.

Decision 315 may be made based on monitoring or evaluating the discard of code affected by the runtime environment induced resource failure or other forms of failure in a programming interface environment. In particular, decision 315 may include evaluating whether the discard at block 310 may render deterministic the execution of the code beyond the scope of the discard. That is, decision 315 may include evaluating whether, during the discard at block 310, another runtime environment induced resource failure is detected, a time-out condition occurs, or some other discard failure condition occurs.

According to one example, decision 315 may include an evaluation as to whether the discard at block 310 has been completed within a threshold amount of time.

Positive decision 315 may be indicative of the discard at block 310 (e.g., thread abort) having been completed within the threshold amount of time, and therefore processing flow 300 may end at termination node 320. More specifically, processing flow 300 may "politely" end at termination node 320, meaning that clean-up code or recovery code associated with code affected by discard 310 may be executed before or simultaneous with execution of code beyond the scope of the discard. The program, or portion thereof, may then resume execution.

Negative decision 315 may be indicative of the discard at block 310 failing to be completed within the threshold amount of time. In that case, processing flow 300 may proceed to increase the scope of discard 325 to further implement a "rude" discard at block 310. That is, as processing flow 300 further proceeds to discard 310, clean-up code or recovery code for the program may be prohibited from executing in order to prevent operating system resources such as memory and file handles from being leaked.

Such processing is not limited to the above example in which the threshold amount of time lapses before the discard at block 310 is completed. Rather, such processing may also be implemented upon the occurrence of other processing failures or exceptional conditions detected upon the discard at block 310.

According to another example, negative decision 315 may indicate that the resource that is subject to the runtime environment exception may be shared by more than just the unit of code (e.g., a thread) affected by the discard initiated at block 310. That is, negative decision 315 may detect a lock on the resource subject to the runtime environment exception, and therefore the runtime environment induced resource failure may be considered to be a critical failure.

Block 325 may therefore include instructing or otherwise prompting an increase of the scope of discard at block 310 to include a state or a group of code to which belongs any unit of code that shares the resource subject to the runtime environment exception. If the discard initiated at block 310 is a thread abort and decision 315 is negative, block 325 may instruct or otherwise prompt an increase or escalation of the scope of the discard at block 310 to include an entire group of threads to which belongs a thread subject to the discard at 310. In the context of a runtime environment, the increase at block 325 may be referred to as unloading an application domain.

In the instance of unloading an application domain at block 310, decision 315 may refer to monitoring or evaluating whether the unloading of the application domain at block 310 may render deterministic execution of code beyond the scope of the discard.

Positive decision 315 may be indicative of the application domain unload at block 310 having been completed within the threshold amount of time, and therefore processing flow 300 may end at termination node 320. That is, processing flow 300 may "politely" end at termination node 320, whereby clean-up code or recovery code associated with code affected by discard 310 may be executed before or simultaneous with execution of code beyond the scope of the discard. The program, or portion thereof, may then resume execution.

Negative decision 315 may be indicative of the application domain unload at block 310 failing to be completed within the threshold amount of time. In that case, processing flow 300 may proceed to increase the scope of discard 325 to further implement a "rude" discard, whereby execution of clean-up code or recovery code associated with code affected by the unloading of the application domain at block 310 may be prohibited. That is, as processing flow 300 further proceeds back to discard 310, clean-up code or recovery code for the program may be prohibited from executing in order to prevent operating system resources such as memory and file handles from being leaked. The program, or portion thereof, may then resume execution.

Such processing is not limited to the above example in which the threshold amount of time lapses before the application domain unload at block 310 is completed. Rather, such processing may also be implemented upon the occurrence of other processing failures or exceptional conditions detected upon the application domain unload at block 310.

According to yet another example, negative decision 315 may indicate that an increased discard at block 310 is not being cleanly executed. In that case, processing flow 300 may proceed to increase the scope of discard 325 whereby the discard at block 310 may be instructed or otherwise prompted to increase discard 310 by entirely terminating the process or program affected by the runtime environment induced resource failure.

By the above examples, portions of a process or program affected by a runtime environment induced resource failure may be discarded in unit increments that escalate in scope according to a programmable policy provided by a host of the process or program (i.e., runtime environment).

Figure 4:
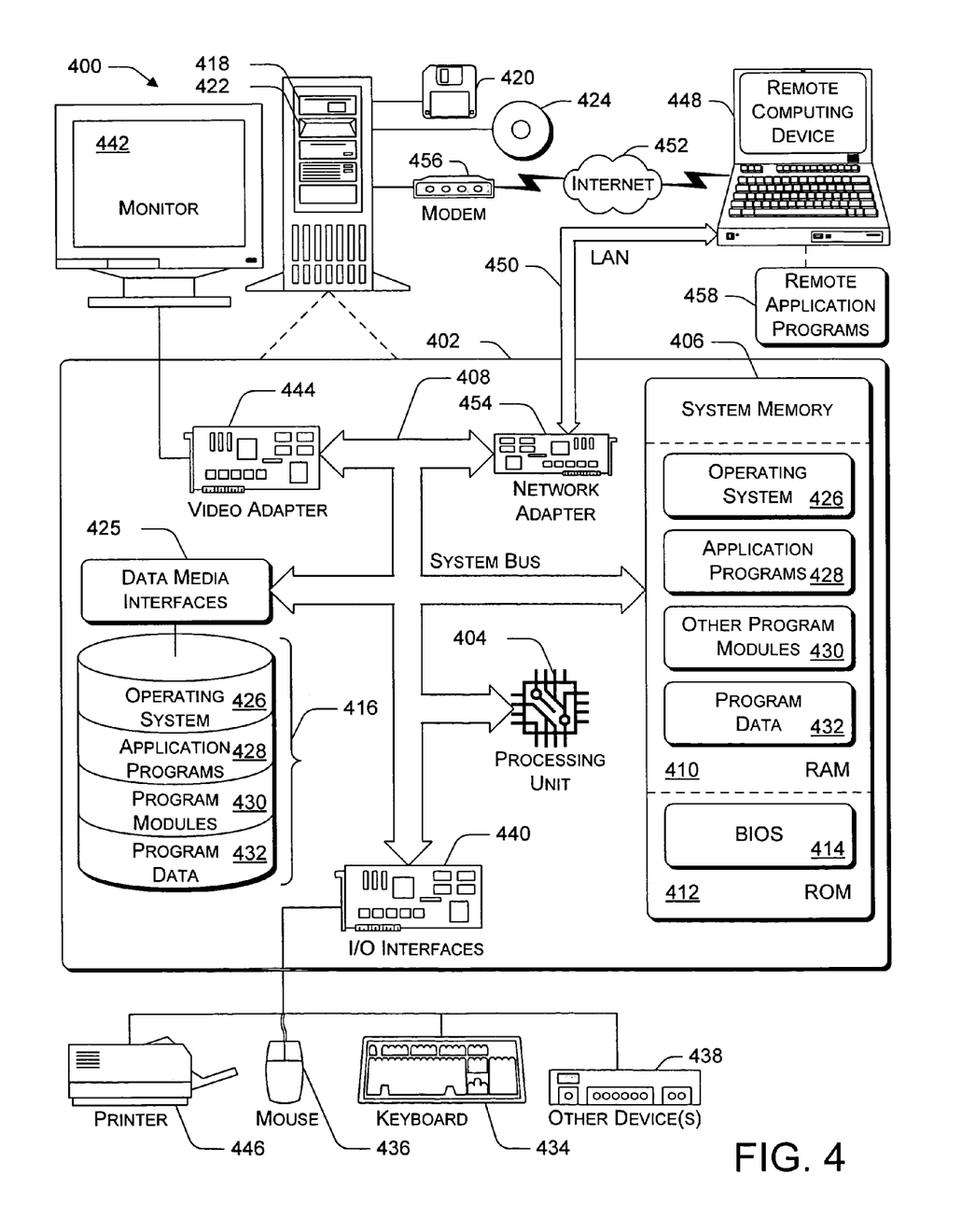
FIG. 4 shows a general computer network environment corresponding to the examples described herein.

FIG. 4 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. Examples of computer 402 may include any of computing device 105, 110, and 115, with reference to FIG. 1. The components of computer 402 can include, but are not limited to, one or more processors or processing units 404, system memory 406, and system bus 408 that couples various system components including processor 404 to system memory 406.

System bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 402 may include a variety of computer readable media. Such media can be any available media that is accessible by computer 402 and includes both volatile and non-volatile media, removable and non-removable media.

System memory 406 includes computer readable media in the form of volatile memory, such as random access memory (RAM) 410; and/or non-volatile memory, such as read only memory (ROM) 412 or flash RAM. Basic input/output system (BIOS) 414, containing the basic routines that help to transfer information between elements within computer 402, such as during start-up, is stored in ROM 412 or flash RAM. RAM 410 typically contains data and/or program modules that are immediately accessible to and/or presently operated on by processing unit 404.

Computer 402 may also include other removable/non-removable, volatile/non-volatile computer storage media. By way of example, FIG. 4 illustrates hard disk drive 416 for reading from and writing to a non-removable, non-volatile magnetic media (not shown), magnetic disk drive 418 for reading from and writing to removable, non-volatile magnetic disk 420 (e.g., a "floppy disk"), and optical disk drive 422 for reading from and/or writing to a removable, non-volatile optical disk 424 such as a CD-ROM, DVD-ROM, or other optical media. Hard disk drive 416, magnetic disk drive 418, and optical disk drive 422 are each connected to system bus 408 by one or more data media interfaces 425. Alternatively, hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, removable magnetic disk 420, and removable optical disk 424, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 416, magnetic disk 420, optical disk 424, ROM 412, and/or RAM 410, including by way of example, operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as keyboard 434 and a pointing device 436 (e.g., a "mouse"). Other input devices 438 (not shown specifically) may include a microphone, joystick, game pad, satellite dish, serial port, scanner, and/or the like. These and other input devices are connected to processing unit 404 via input/output interfaces 440 that are coupled to system bus 408, but may be connected by other interface and bus structures, such as a parallel port, game port, or a universal serial bus (USB).

Monitor 442 or other type of display device can also be connected to the system bus 408 via an interface, such as video adapter 444. In addition to monitor 442, other output peripheral devices can include components such as speakers (not shown) and printer 446 which can be connected to computer 402 via I/O interfaces 440.

Computer 402 can operate in a networked environment using logical connections to one or more remote computers, such as remote computing device 448. By way of example, remote computing device 448 can be a PC, portable computer, a server, a router, a network computer, a peer device or other common network node, and the like. Remote computing device 448 is illustrated as a portable computer that can include many or all of the elements and features described herein relative to computer 402. Alternatively, computer 402 can operate in a non-networked environment as well.

Logical connections between computer 402 and remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, computer 402 is connected to local network 450 via network interface or adapter 454. When implemented in a WAN networking environment, computer 402 typically includes modem 456 or other means for establishing communications over wide network 452. Modem 456, which can be internal or external to computer 402, can be connected to system bus 408 via I/O interfaces 440 or other appropriate mechanisms. It is to be appreciated that the illustrated network connections are examples and that other means of establishing at least one communication link between computers 402 and 448 can be employed.

In a networked environment, such as that illustrated with computing environment 400, program modules depicted relative to computer 402, or portions thereof, may be stored in a remote memory storage device. By way of example, remote application programs 458 reside on a memory device of remote computer 448. For purposes of illustration, applications or programs and other executable program components such as the operating system are illustrated herein as discrete blocks, although it is recognized that such programs and components reside at various times in different storage components of computing device 402, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, comprising:
    initiating a discard of a portion of a process affected by a resource failure;
    increasing a scope of the discard if
        a time-out condition occurs, or
        an exception is generated; and
    executing a portion of the process beyond the increased scope of the discard, wherein:
    initiating the discard includes initiating a thread abort; and
    increasing the scope of the discard includes terminating the thread abort rudely if a threshold amount of time elapses without completion of the thread abort.

2. A method according to claim 1, wherein terminating the thread abort rudely includes prohibiting clean-up code from executing.

3. A method, comprising:
    initiating a discard of a portion of a process affected by a resource failure;
    increasing a scope of the discard if
        a timeout condition occurs, or
        an exception is generated; and
    executing a portion of the process beyond the increased scope of the discard, wherein:
    initiating the discard includes initiating a thread abort; and
    increasing the scope of the discard includes unloading a group of threads to which any thread sharing the resource belongs if the resource failure affects a resource shared by more than one thread in the process, wherein:
    increasing the scope of the discard further includes terminating the process if the group of threads to which any thread sharing the resource belongs cannot be unloaded without an exceptional condition occurring in execution of at least one of clean-up code or recovery code.

4. A method, comprising:
    initiating a discard of a portion of a process affected by a resource failure;
    increasing a scope of the discard if
        a timeout condition occurs, or
        an exception is generated; and
    executing a portion of the process beyond the increased scope of the discard wherein:
    initiating the discard includes initiating a thread abort; and
    increasing the scope of the discard includes:
        unloading a group of threads to which any thread sharing the resource belongs if the resource failure affects a resource shared by more than one thread in the process, and
        terminating the unloading rudely if a threshold amount of time elapses before completion of the unloading.

5. A method according to claim 4, wherein terminating the unloading rudely includes prohibiting clean-up code from executing.

6. A system, comprising:
    a discarder to initiate a discard of code from a process having a resource failure identified therein;
    a monitor to prompt the discarder to escalate a scope of the discard based on at least one discard parameter, the monitor being configured to prompt the discarder to escalate the scope of the discard if the discard of code does not complete in accordance with a policy; and
    a processor to execute a portion of the process beyond the scope of the discard.

7. A system according to claim 6, wherein:
    the discarder is to initiate a thread abort for a thread affected by the resource failure; and
    the monitor is to prompt the discarder to unload an application domain to which the thread belongs if the resource failure affects a resource shared by more than one thread.

8. A system according to claim 7, wherein the monitor is to further prompt the discarder to prohibit execution of cleanup code associated with any thread in the application domain if a threshold amount of time passes before completion of the unload.

9. A system according to claim 7, wherein the monitor is to further prompt the discarder to terminate the process if the unload fails to unload the application domain without an exceptional condition occurring during execution of at least one of cleanup code or recovery code.

10. A system according to claim 6, wherein:
the discarder is to initiate a thread abort for a thread affected by the resource failure; and
the monitor is to prompt the discarder to complete the thread abort and prohibit execution of cleanup code associated with the thread if a predetermined amount of time passes before completion of the thread abort.

11. A system according to claim 6, wherein:
the discarder is to initiate a thread abort for a thread affected by the resource failure; and the monitor is to prompt the discarder to unload an application domain to which the thread belongs if a predetermined amount of time passes before completion of the thread abort and if the resource is shared by more than one thread.

12. A system according to claim 11, wherein the monitor is to further prompt the discarder to terminate the process if the unload fails to unload the group of threads without an exceptional condition occurring during execution of at least one of clean-up code or recovery code.

13. At least one computer storage medium having at least one instruction causing one or more processors to:
categorize a runtime environment induced resource failure in a program;
discard at least a portion of the program in unit increments that escalate in scope according to a programmable policy, wherein the programmable policy includes
testing whether a code discard completes in accordance with a policy parameter, and
escalating the scope if the code discard does not complete in accordance with the policy parameter; and
execute at least a portion of the program that is not included in the discard.

14. At least one computer storage medium according to claim 13, wherein the programmable policy is provided by a host of the program.

15. At least one computer storage medium according to claim 13, wherein the host of the program is a runtime environment.

16. At least one computer storage medium according to claim 13, wherein the at least one instruction to discard at least a portion of the program causes the one or more processors to abort a thread affected by the runtime environment induced resource failure.

17. At least one computer storage medium according to claim 16, wherein the at least one instruction to abort a thread further causes the one or more processors to prohibit execution of at least one of clean-up code and recovery code associated with the thread if a threshold amount of time elapses before completion of the abort.

18. At least one computer storage medium according to claim 13, wherein the at least one instruction to discard at least a portion of the program causes the one or more processors to unload a group of threads if the runtime environment induced resource failure affects a resource shared by more than one thread, wherein further the group of threads includes at least one thread that shares the resource.

19. At least one computer storage medium according to claim 18, wherein the at least one instruction to unload a group of threads further causes the one or more processors to prohibit execution of clean-up code associated with one of the group of threads if a threshold amount of time passes before completion of the unload.

20. At least one computer storage medium according to claim 13, wherein the at least one instruction to discard at least a portion of the program causes the one or more processors to terminate the program when the runtime environment induced resource failure affects a resource shared by more than one thread in the program and at least one of a group of threads that includes at least one thread that shares the resource cannot be unloaded without an exceptional condition occurring during execution of cleanup code or recovery code.

21. A processor, comprising:
means for initiating a discard of a portion of a process affected by a resource failure;
means for increasing a scope of the discard, the means for increasing the scope of the discard including
means for determining whether the discard completes in accordance with a policy, and
means for increasing the scope of the discard if the means for determining whether the discard completes in accordance with the policy determines that the discard did not complete in accordance with the policy; and
means for executing a portion of the process beyond the scope of the discard.

22. A processor according to claim 21, wherein:
the means for initiating the discard initiates a thread abort; and
the means for increasing the scope of the discard prohibits execution of at least one of clean-up code and recovery code after completion of the thread abort if a threshold amount of time elapses before completion of the thread abort.

23. A processor according to claim 21, wherein:
the means for initiating the discard initiates a thread abort; and
the means for increasing the scope of the discard unloads an application domain to which any thread sharing the resource belongs if the failure affects a resource shared by more than one thread in the process.

24. A processor according to claim 21, wherein:
the means for initiating the discard initiates a thread abort; and
the means for increasing the scope of the discard unloads a group of threads to which any thread sharing the resource belongs if the failure affects a resource shared by more than one thread in the process, and further prohibits execution of at least one of clean-up code and recovery code associated with any thread in the group of threads after completion of the unloading if a threshold amount of time passes before completion of the unload.

25. A processor according to claim 24, wherein:
the means for increasing the scope of the discard further terminates the process based on the further discard condition that the unload is not executed without an exceptional condition occurring during execution of at least one of associated cleanup code and recovery code.

* * * * *

UNITED STATES PATENT AND TRADEMARK OFFICE
CERTIFICATE OF CORRECTION

| | | |
|---|---|---|
| PATENT NO. | : 7,487,380 B2 | Page 1 of 1 |
| APPLICATION NO. | : 10/966333 | |
| DATED | : February 3, 2009 | |
| INVENTOR(S) | : Christopher W. Brumme et al. | |

It is certified that error appears in the above-identified patent and that said Letters Patent is hereby corrected as shown below:

In column 10, line 15, in Claim 3, delete "timeout" and insert -- time-out --, therefor.

In column 10, line 33, in Claim 4, delete "timeout" and insert -- time-out --, therefor.

In column 10, line 36, in Claim 4, delete "discard" and insert -- discard, --, therefor.

In column 10, line 67, in Claim 8, delete "cleanup" and insert -- clean-up --, therefor.

In column 11, line 8, in Claim 9, delete "cleanup" and insert -- clean-up --, therefor.

In column 11, line 13, in Claim 10, delete "cleanup" and insert -- clean-up --, therefor.

In column 12, line 15, in Claim 20, delete "cleanup" and insert -- clean-up --, therefor.

In column 12, line 62, in Claim 25, delete "cleanup" and insert -- clean-up --, therefor.

Signed and Sealed this
Third Day of May, 2011

David J. Kappos
*Director of the United States Patent and Trademark Office*